(12) United States Patent
Rondeau et al.

(10) Patent No.: US 11,878,444 B2
(45) Date of Patent: Jan. 23, 2024

(54) METHOD FOR MANUFACTURING A HOLLOW COMPOSITE STRUCTURE, PARTICULARLY A SPAR BEAM FOR A WIND TURBINE ROTOR BLADE, AND AN ASSOCIATED MANDREL

(71) Applicant: General Electric Company, Schenectady, NY (US)

(72) Inventors: Louis Rondeau, Greenville, SC (US); Aaron A. Yarbrough, Greenville, SC (US); Xu Chen, Simpsonville, SC (US); Scott Iverson Shillig, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 157 days.

(21) Appl. No.: 17/312,735

(22) PCT Filed: Dec. 11, 2018

(86) PCT No.: PCT/US2018/064827
§ 371 (c)(1),
(2) Date: Jun. 10, 2021

(87) PCT Pub. No.: WO2020/122862
PCT Pub. Date: Jun. 18, 2020

(65) Prior Publication Data
US 2022/0016808 A1    Jan. 20, 2022

(51) Int. Cl.
*F03D 1/06*        (2006.01)
*B29C 33/50*      (2006.01)
(Continued)

(52) U.S. Cl.
CPC .......... *B29C 33/505* (2013.01); *B29C 70/446* (2013.01); *B29D 99/0028* (2013.01); *F03D 1/0675* (2013.01)

(58) Field of Classification Search
CPC . B29C 33/505; B29C 70/446; B29D 99/0028; F03D 1/0675; F03D 1/065; F03D 1/0683; F05B 2230/50
See application file for complete search history.

(56) References Cited

U.S. PATENT DOCUMENTS

| 851,196 A | 4/1907 | Bevans et al. |
| 3,629,030 A | 12/1971 | Ash |

(Continued)

FOREIGN PATENT DOCUMENTS

| CN | 105690790 A | 6/2016 |
| EP | 2186622 A1 | 5/2010 |

(Continued)

OTHER PUBLICATIONS

Hoffman, Alexander et al., "Fiber composite semifinished product." EPO, Feb. 27, 2020 published, Aug. 27, 2018 filed, under DE 102018120905-A1, (Year: 2018).*

(Continued)

*Primary Examiner* — Sabbir Hasan
*Assistant Examiner* — Joshua R Beebe
(74) *Attorney, Agent, or Firm* — Dority & Manning, P.A.

(57) ABSTRACT

A method for producing a hollow composite structure, such as a spar beam for use in a wind turbine blade, includes placing fiber reinforcement material around a mandrel within a mold, and curing the fiber reinforcement material. The mandrel is formed from a compressible material having a rigid neutral state with a rigidity to maintain a defined shape of the mandrel during lay up and curing of the fiber reinforcement material. Subsequent to curing, a vacuum is drawn on the mandrel to compress the compressible material so that the compressed mandrel can be drawn out through an opening in the composite structure, the opening having a (Continued)

size such that the mandrel could not be withdrawn through the opening in the rigid neutral state of the mandrel.

17 Claims, 4 Drawing Sheets

(51) Int. Cl.
   *B29C 70/44* (2006.01)
   *B29D 99/00* (2010.01)

(56) References Cited

U.S. PATENT DOCUMENTS

| | | | |
|---|---|---|---|
| 3,764,641 A | 10/1973 | Ash | |
| 3,942,753 A * | 3/1976 | Sachs | B28B 7/34 |
| | | | 249/162 |
| 4,474,536 A | 10/1984 | Gougeon et al. | |
| 4,643,646 A | 2/1987 | Hahn et al. | |
| 4,657,615 A * | 4/1987 | Braun | B64C 3/185 |
| | | | 156/173 |
| 4,684,423 A | 8/1987 | Brooks | |
| 4,698,011 A * | 10/1987 | Lamalle | B29C 70/446 |
| | | | 425/389 |
| 4,732,542 A | 3/1988 | Hahn et al. | |
| 5,281,454 A | 1/1994 | Hanson | |
| 6,843,953 B2 | 1/2005 | Filsinger et al. | |
| 7,334,989 B2 | 2/2008 | Arelt | |
| 7,344,360 B2 | 3/2008 | Wetzel | |
| 7,901,188 B2 | 3/2011 | Llorente Gonzalez et al. | |
| 7,922,454 B1 * | 4/2011 | Riddell | F03D 1/0675 |
| | | | 416/224 |
| 7,927,077 B2 | 4/2011 | Olson | |
| 7,997,874 B2 | 8/2011 | van der Bos | |
| 7,998,303 B2 | 8/2011 | Bachmann et al. | |
| 8,007,624 B2 * | 8/2011 | Stiesdal | B29C 33/505 |
| | | | 156/286 |
| 8,123,488 B2 | 2/2012 | Finnigan et al. | |
| 8,297,932 B2 | 10/2012 | Arocena De La Rua et al. | |
| 8,348,622 B2 | 1/2013 | Bech | |
| 8,356,982 B2 | 1/2013 | Petri Larrea et al. | |
| 8,376,713 B2 | 2/2013 | Kawasetsu et al. | |
| 8,388,316 B2 | 3/2013 | Arocena De La Rua et al. | |
| 8,517,689 B2 | 8/2013 | Kyriakides et al. | |
| 8,919,754 B2 | 12/2014 | Schibsbye | |
| 9,669,589 B2 * | 6/2017 | Zamora Rodriguez | |
| | | | B29C 70/443 |
| 2007/0018049 A1 | 1/2007 | Stuhr | |
| 2007/0253824 A1 | 11/2007 | Eyb | |
| 2009/0116962 A1 | 5/2009 | Pedersen et al. | |
| 2009/0155084 A1 | 6/2009 | Livingston et al. | |
| 2009/0162208 A1 | 6/2009 | Zirin et al. | |
| 2010/0132884 A1 | 6/2010 | Bachmann et al. | |
| 2010/0215494 A1 | 8/2010 | Bech et al. | |
| 2010/0304170 A1 | 12/2010 | Frederiksen | |
| 2011/0052403 A1 | 3/2011 | Kawasetsu et al. | |
| 2011/0081247 A1 | 4/2011 | Hibbard | |
| 2011/0081248 A1 | 4/2011 | Hibbard | |
| 2011/0091326 A1 | 4/2011 | Hancock | |
| 2011/0158788 A1 | 6/2011 | Bech et al. | |
| 2011/0158806 A1 | 6/2011 | Arms et al. | |
| 2011/0229336 A1 | 9/2011 | Richter et al. | |
| 2012/0093627 A1 | 4/2012 | Christenson et al. | |
| 2012/0196079 A1 | 8/2012 | Brauers et al. | |
| 2012/0213642 A1 | 8/2012 | Wang et al. | |
| 2012/0269643 A1 | 10/2012 | Hibbard et al. | |
| 2012/0308396 A1 | 12/2012 | Hibbard | |
| 2013/0040151 A1 | 2/2013 | Jeromerajan et al. | |
| 2013/0064663 A1 | 3/2013 | Loth et al. | |
| 2013/0129518 A1 | 5/2013 | Hayden et al. | |
| 2013/0153144 A1 * | 6/2013 | Tupper | B32B 37/14 |
| | | | 156/349 |
| 2013/0164133 A1 | 7/2013 | Grove-Nielsen | |
| 2013/0177433 A1 | 7/2013 | Fritz et al. | |
| 2013/0189112 A1 | 7/2013 | Hedges et al. | |
| 2013/0189114 A1 | 7/2013 | Jenzewski et al. | |
| 2013/0216388 A1 * | 8/2013 | Akhtar | F03D 1/0683 |
| | | | 29/428 |
| 2013/0219718 A1 | 8/2013 | Busbey et al. | |
| 2013/0224032 A1 | 8/2013 | Busbey et al. | |
| 2013/0236307 A1 | 9/2013 | Stege | |
| 2013/0236321 A1 | 9/2013 | Olthoff | |
| 2014/0286780 A1 | 9/2014 | Lemos et al. | |
| 2015/0204200 A1 | 7/2015 | Eyb et al. | |
| 2015/0369211 A1 | 12/2015 | Merzhaeuser | |

FOREIGN PATENT DOCUMENTS

| | | | | |
|---|---|---|---|---|
| EP | 3144526 A1 | 3/2017 | | |
| FR | 2710871 A1 | 4/1995 | | |
| GB | 2477847 A | 8/2011 | | |
| GB | 2525243 A | 10/2015 | | |
| JP | 2003094448 A | 4/2003 | | |
| JP | 2011507739 A | 6/2011 | | |
| JP | 2011235635 A | 11/2011 | | |
| WO | WO2009/034291 A2 | 3/2009 | | |
| WO | WO2009/077192 A2 | 6/2009 | | |
| WO | WO2010/023299 A2 | 3/2010 | | |
| WO | WO-2010023140 A1 * | 3/2010 | | F03D 1/0675 |
| WO | WO2011/064553 A2 | 6/2011 | | |
| WO | WO2011/066279 A2 | 6/2011 | | |
| WO | WO2015/051803 A1 | 4/2015 | | |
| WO | WO2015/185066 A1 | 12/2015 | | |
| WO | WO-2018215457 A1 * | 11/2018 | | F03D 1/0675 |

OTHER PUBLICATIONS

PCT International Search Report & Opinion Corresponding to PCT/US2018/064827 dated Aug. 27, 2019.

JP Office Action with English translation for JP application No. 2021-532199, 14 pages.

CN Office Action with English translation for CN application No. 201880100178.X, 24 pages.

Chen, Jia-Fu, et al.., Encyclopedia of Chemicals, vol. 5, Fluorine Compounds—Industrial Solvents, Chemical Industry Press Co., Ltd., Nov. 30, 1993, pp. 237-239. (translation of abstract only).

* cited by examiner

METHOD FOR MANUFACTURING A HOLLOW COMPOSITE STRUCTURE, PARTICULARLY A SPAR BEAM FOR A WIND TURBINE ROTOR BLADE, AND AN ASSOCIATED MANDREL

FIELD

The present subject matter relates generally to the manufacture of hollow composite structures, and more particularly to an improved method for manufacturing a spar beam for use in a wind turbine rotor blade.

BACKGROUND

With conventional processes for manufacturing hollow composite structures, a rigid mandrel is used to define the hollow space. Steel or aluminum mandrels are typically used. Fiber material or sheets, such as prepreg glass fiber material, are laid up on the mandrel, wherein the position and shape of the fibre material on the mandrel essentially defines the composite part. A second mold part completes the mold, and the fiber material is cured in a conventional vacuum resin curing process. This process is widely used, including in the production of strong and light-weight composite structures used in wind turbine rotor blades.

In certain instances, however, the rigid or solid mandrel can be difficult to remove from the composite structure, particularly if the opening in the structure is smaller than the dimensions of the mandrel. For example, U.S. Pat. No. 8,919,754 describes the situation wherein, after producing a wind turbine blade as described above, the blade has only a small opening at its blade root through which the mandrel can be removed. Thus, depending on the shape of the rotor blade, the mandrel must include a relatively high amount of flexible material compared to solid material, which is disadvantageous because the flexible material can deform during the casting process. The '754 patent proposes a mandrel having an expandable body, wherein in the expanded state, the outer surface of the body defines the interior shape of the fibre-reinforced composite part to be produced. The body is pumped with air to achieve the expanded state, and vented to achieve a collapsed state. A foldable framework may be provided within the body, wherein the framework unfolds in the expanded state of the body to provide structural rigidity to the mandrel. Also, spacer elements are installed within the body to provide the desired outer surface shape of the expandable body.

In recent years, wind turbines for wind power generation have increased in size to achieve improvement in power generation efficiency and to increase the amount of power generation. Along with the increase in size of wind turbines for wind power generation, wind turbine rotor blades have also significantly increased in size (e.g., up to 55 meters in length), resulting in difficulties in integral manufacture as well as conveyance and transport of the blades to a site.

In this regard, the industry is developing sectional wind turbine rotor blades wherein separate blade segments are manufactured and transported to a site for assembly into a complete blade (a "jointed" blade). In certain constructions, the blade segments are joined together by a spar beam structure that extends span-wise from one blade segment into a receiving section of the other blade segment. Reference is made, for example, to US Patent Publication No. 2015/0369211, which describes a first blade segment with a spar beam structure extending lengthways that structurally connects with a second blade segment at a receiving section. The spar beam structure forms a portion of the internal support structure for the blade and is a box-beam structure with a suction side spar cap and a pressure side spar cap. Multiple bolt joints are on the beam structure for connecting with the receiving end of the second blade segment, as well as multiple bolt joints located at the chord-wise joint between the blade segments.

The present invention is drawn to an improved method for producing a hollow fiber-reinforced composite structure, such as the spar beam structure discussed above for a wind turbine blade, without the need of a relatively complex and expensive inflatable mandrel as described in the '754 patent.

BRIEF DESCRIPTION

Aspects and advantages of the invention will be set forth in part in the following description, or may be obvious from the description, or may be learned through practice of the invention.

In one aspect, the present disclosure is directed to a method for producing a hollow composite structure, such as a fiber-reinforced hollow component. The method includes placing fiber reinforcement material around a mandrel within a mold, and curing the fiber reinforcement material in a conventional fiber lay up and resin molding process. As compared to conventional mandrels, however, the present method uses a mandrel formed from a compressible material having a rigid neutral state with a defined shape corresponding to the desired shape of the composite structure and a rigidity in the neutral state to maintain the defined shape during lay up and curing of the fiber reinforcement material. Subsequent to curing, the method includes drawing a vacuum on the mandrel to compress and reduce the size of the compressible material. At its reduced size, the compressed mandrel is then withdrawn through an opening in the composite structure, the opening having a size such that the mandrel could not be withdrawn through the opening in its neutral state.

In a particular embodiment, the composite structure is a tapered box-beam structure having a larger closed end and a smaller open end corresponding to the opening through which the compressed mandrel is withdrawn. The box-beam structure may be a spar structure for use in a wind turbine rotor blade, particularly a spar structure used to connect blade components in a jointed wind turbine blade.

The type of compressible material can vary, and generally includes any suitable solid polymeric foam material having a neutral state with sufficient rigidity to maintain its defined shape during the fiber material lay up and curing process. A number of such foams are readily commercially available. In a particular embodiment, the solid foam material may be an open-cell foam material, particularly from a cost consideration. The solid foam material may be a closed-cell foam material, which are generally more rigid than open-cell foams but significantly more expensive.

In a particular embodiment, the compressible material comprises a combination of different types of foam materials. For example, the mandrel may have a core of a more rigid or a less rigid foam as compared to one or more outer layers of a different foam. The core foam material may be a closed-cell foam, and the one or more outer layers may be an open-cell foam In yet other embodiments, the mandrel need not be formed entirely of a compressible material. For example, the mandrel may have a non-compressible core, such as a plastic or wood core, surrounded by one or more outer layers of a compressible foam material.

In particular embodiments of the method, the mandrel includes an airtight covering surrounding the compressible material. This covering may be, for example, an elastic material sprayed or otherwise applied over the foam material, or an elastic bag, wrapping, or sleeve into which the foam material is slid. A vacuum is drawn on the mandrel by connecting the airtight covering to a vacuum source, which results in the compression and shrinkage of the mandrel. The method may include subsequently venting the airtight covering, wherein the compressible material has sufficient elasticity to return the mandrel to its rigid neutral state.

The present invention also encompasses various embodiments of a mandrel for use in producing a hollow composite structure, as discussed above. The mandrel includes a compressible material having a rigid neutral state and a defined shape corresponding to a desired shape of the composite structure. As discussed, the compressible material has a rigidity in the neutral state to maintain the defined shape during lay up and curing of fiber reinforcement material placed around the mandrel. The compressible material is transformable into a compressed or shrunken state upon application of a vacuum thereto. The compressible material has sufficient elasticity to return to the rigid neutral state upon release of the vacuum.

The defined rigid shape of the mandrel will depend on the intended use of the composite structure. For example, the defined shape may be an elongated tapered shape corresponding to a desired tapered box-beam shape for the composite structure, wherein the tapered shape has a larger cross-sectional end and an opposite smaller cross-sectional end.

As discussed above, the type of compressible material can vary, and generally includes any suitable solid polymeric foam material having a neutral state with sufficient rigidity to maintain its defined shape during the fiber material lay up and curing process, and sufficient elasticity to return to its rigid neutral state upon release of the compressive force applied thereto.

The compressible material may be a combination of different types of foam materials. For example, the mandrel may have a core of a more rigid or less rigid foam (such as a closed-cell foam) and one or more outer layers of less-rigid foam, such as an open-cell foam In yet other embodiments, the mandrel need not be formed entirely of a compressible material. For example, the mandrel may have a non-compressible core, such as a plastic or wood core, surrounded by one or more outer layers of a compressible foam material. In still another example, the core may be an "empty" core. In other words, the core may be an open-air core.

The mandrel may also include an airtight covering surrounding the compressible material, wherein the vacuum is drawn on the mandrel by connecting the airtight covering to a vacuum source. A vent may be provided in the covering, wherein the compressible material is returnable to its rigid neutral state by venting the covering.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
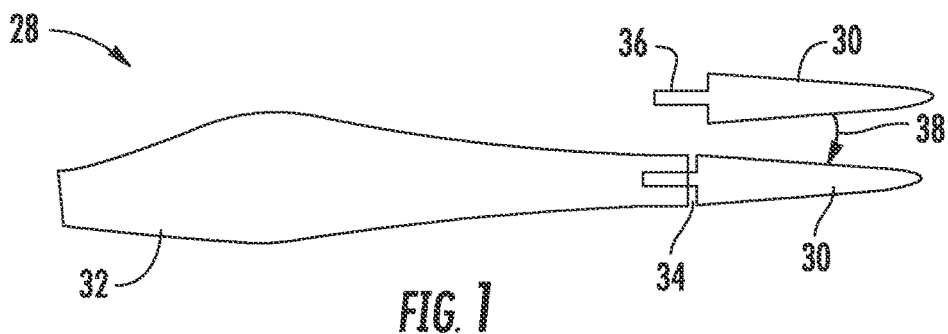
FIG. 1 illustrates a jointed wind turbine rotor blade having a first blade segment and a second blade segment; in accordance with the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a method for producing a hollow composite structure wherein the mandrel used as a former in the mold cannot be removed through the opening in the composite structure. It should be appreciated that the method is not limited to the particular type or intended use of the composite structure. The method does, however, have particular usefulness in the manufacture of tapered composite beam structures used in the production of wind turbine blades and, in this regard, exemplary non-limiting embodiments of the present method and associated mandrel are explained herein with reference to a spar beam structure used in production of jointed wind turbine blades.

Figure 2:
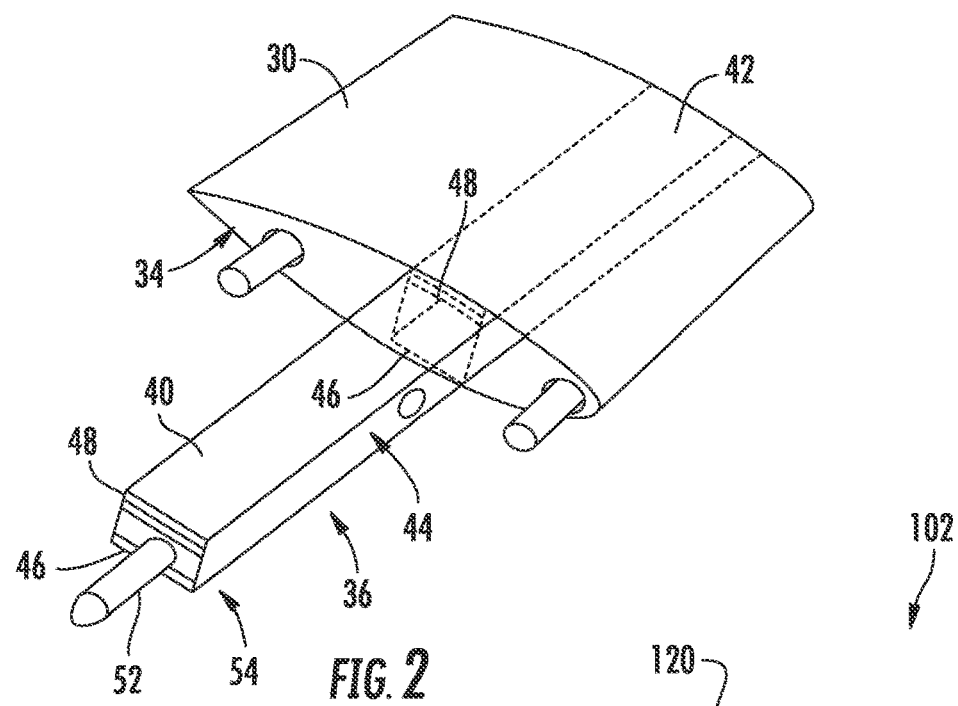
FIG. 2 is a perspective view of an embodiment of a first blade segment having a spar beam component.

Referring to FIGS. 1 and 2, a jointed rotor blade 28 is depicted having a first blade segment 30 and a second blade segment 32 extending in opposite directions a chord-wise joint 34. The first blade segment 30 and the second blade segment 32 are connected by an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 20, 32 are joined by inserting the internal support structure 36 into the second blade segment 32.

Referring particularly to FIG. 2, the first blade segment 30 includes a spar beam structure 40 that forms a portion of the internal support structure 36 and extends lengthways (e.g., span-wise) for structurally connecting with the second blade segment 32. The spar beam structure 40 may be integrally formed with the first blade segment 30 as an extension protruding from a spar section 42, thereby forming an extending spar section. The spar beam structure 40 is a box-beam composite structure having opposite shear webs 44 connected with a suction side spar cap 46 and a pressure side spar cap 48. An end structure 54 is connected to the spar beam structure 44 and includes a bolt tube 52.

Although not depicted in the figures, the second blade segment includes a receiving section at the joint line 34, wherein the spar beam structure 44 slides into the receiving section to join the blade segments 30, 32. The bolt tube 52 fits into a receiving slot in an end face of the receiving section.

The spar beam structure 44 is manufactured as a fiber reinforced composite structure in a conventional fiber material lay up and curing process. The beam structure has a tapered profile that tapers from a larger (cross-sectional area) closed end to an open, smaller end 54. Thus, a conventional rigid mandrel is not suitable in the manufacturing process because such a mandrel cannot readily be removed through the small end 54 of the spar beam structure 44.

Figure 3:
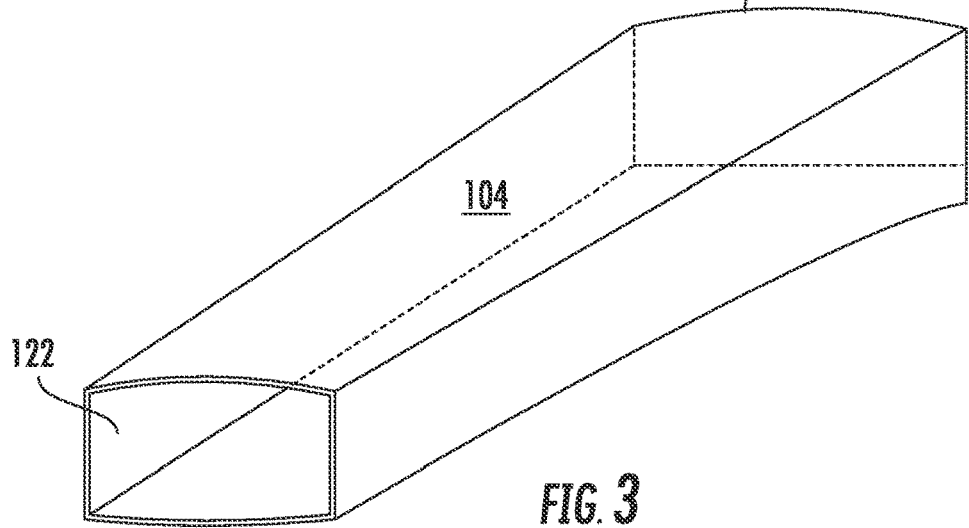
FIG. 3 is a perspective view of a hollow composite structure that can be produced in accordance with method embodiments of the present invention.

The present disclosure provides a method for producing a hollow composite structure 102 (FIG. 3), such as a hollow fiber-reinforced component similar to the spar beam structure 44 discussed above wherein the structure tapers from a larger (cross-sectional area) closed end 120 towards a smaller open end 122. An embodiment of the method 100 is depicted in FIGS. 4a through 4l and discussed in greater detail below.

Figure 4A:
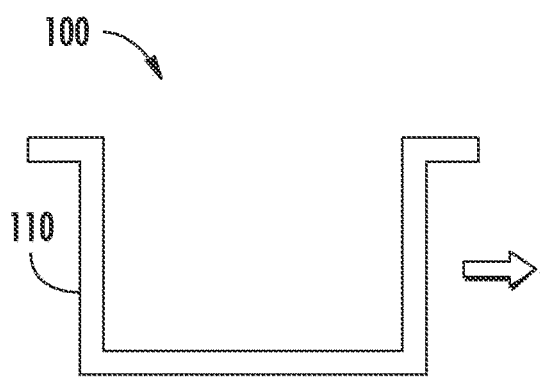
FIGS. 4a through 4l depict sequential method steps in accordance with an embodiment of the invention.

FIG. 4a depicts a first mold (male) component 110 used in a conventional fiber lay up and curing process. The outer surface of the structural component 102 is controlled by the inner surface of the mold component 110.

Figure 4B:
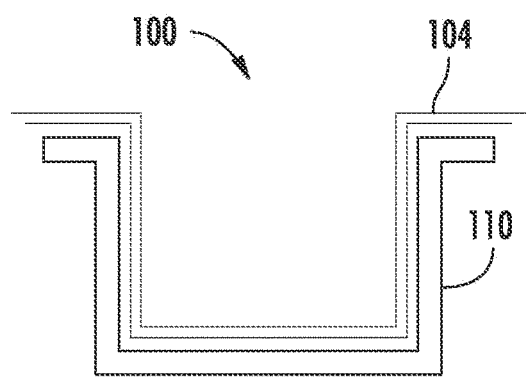

In FIG. 4b, the fiber reinforcement material 104 in the form of glass plies are laid into the first mold component 110. Suitable materials 104 are well known to those skilled in the art, and may include mineral fibers and polymer fibers, including glass fibers, metallic fibers, or carbon fibers. The fiber reinforcement material 104 may include polymer fiber, such as aromatic polyamides, polyethylene, polyurethane or aramide fibers. The fiber material 104 may comprise different types of fiber materials and may form a composite material. The fiber material 104 may in in the form of unidirectional or multidirectional fibers, prepregs, fiber boards, or fiber mats.

Figure 4D:
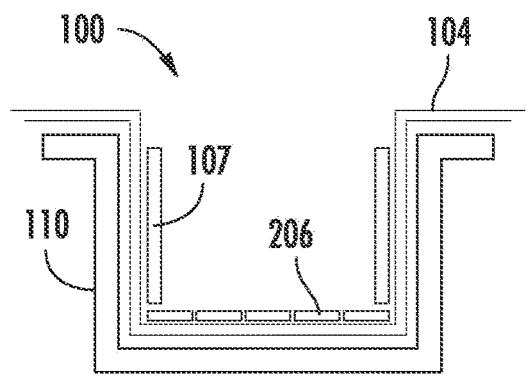
Figure 4C:
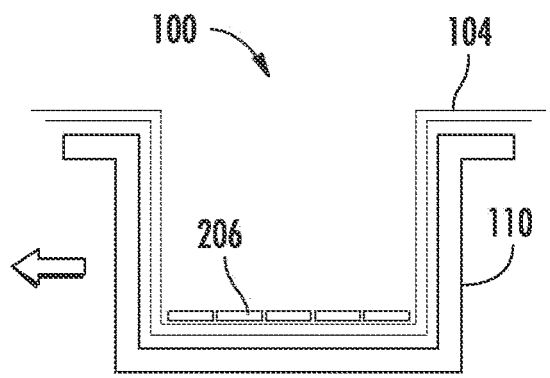

FIG. 4c depicts an optional step of laying carbon pultrusion rods 106 in the bottom of the mold 110 on top of the fiber reinforcement material 104. The pultrusion rods 106 add to the structural integrity of the spar cap sections of the final composite structure 102 (particularly, the spar beam structure 44).

FIG. 4d depicts the optional step of placing fiber mats or boards 107 in the mold 110 that will serve to add structural rigidity to the shear web components 44 of the spar beam structure 44.

Figure 4E:
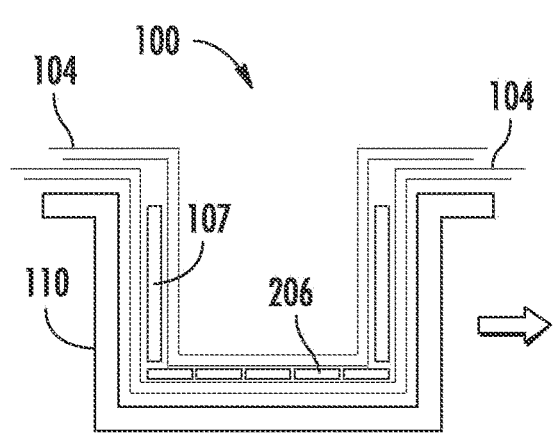

FIG. 4e depicts the laying of an additional layer(s) of the fiber reinforcement material 104 (e.g., glass plies) such that the pultrusion rods 106 and fiber boards 107 are sandwiched between the first and second layers of the fiber reinforcement materials 104.

Figure 4F:
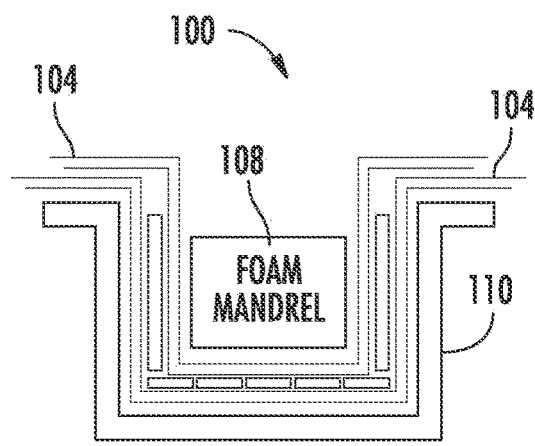

FIG. 4f depicts placement of the mandrel 108 in the mold 110. The mandrel 108 is formed from a compressible material 114 having a rigid neutral state (uncompressed state) with a defined shape corresponding to the desired shape of the composite structure 102 and a rigidity in the neutral state to maintain the defined shape during lay up and curing of the fiber reinforcement materials 104, 106, 107.

Figure 4G:
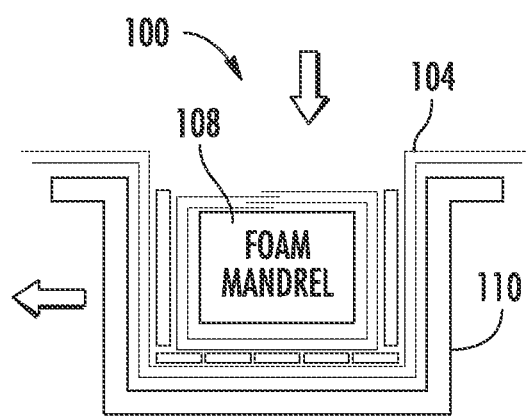
Figure 4H:
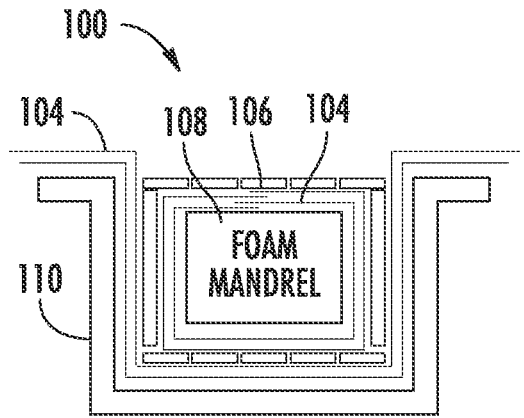
Figure 4I:
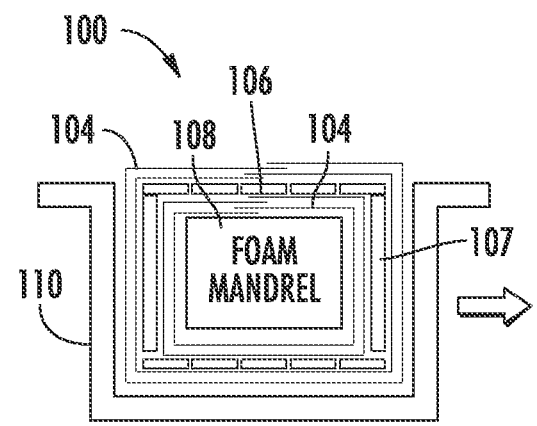

FIG. 4g depicts the inner layer(s) of fiber reinforcement material 104 folded over the mandrel 108, and FIG. 4h depicts additional carbon pultrusions 106 laid on the folded-over material 104. These additional pultrusions will provide structural rigidity and strength to the opposite spar cap of the spar beam structure 40. FIG. 4i depicts the second layer(s) of the fiber reinforcement material 104 folded over the additional pultrusions 106.

Figure 4J:
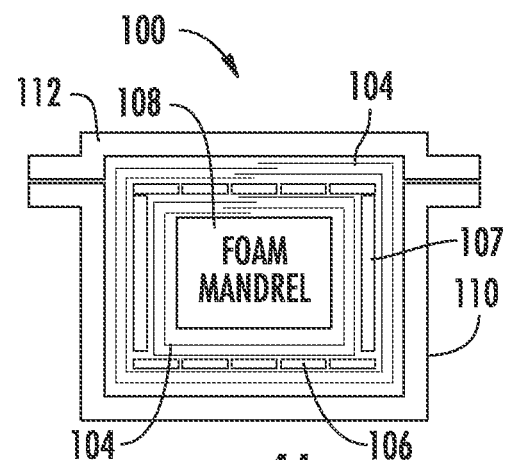

In FIG. 4j, the second mold component 112 (mold cap) is installed over the fiber/mandrel layup. As understood in the art, a vacuum is then drawn in the mold and a conventional resin infusion process is performed. The layup is then cured.

Figure 4K:
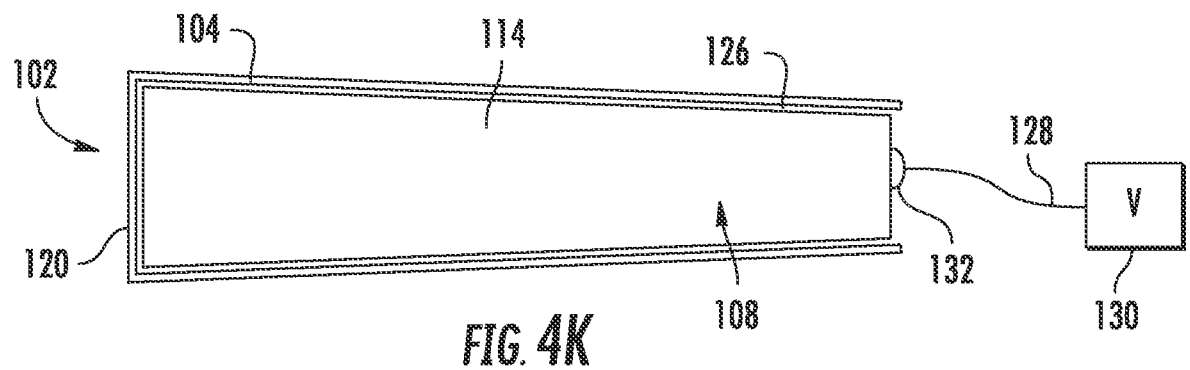

FIG. 4k depicts that the layup has been removed from the mold. The mandrel 108 is within the interior of the composite structure 102. A vacuum is drawn on the mandrel 108 by connecting the mandrel 108 to a vacuum source 130 via a line 128 connected to a fitting 132 on the mandrel 108.

Figure 4L:
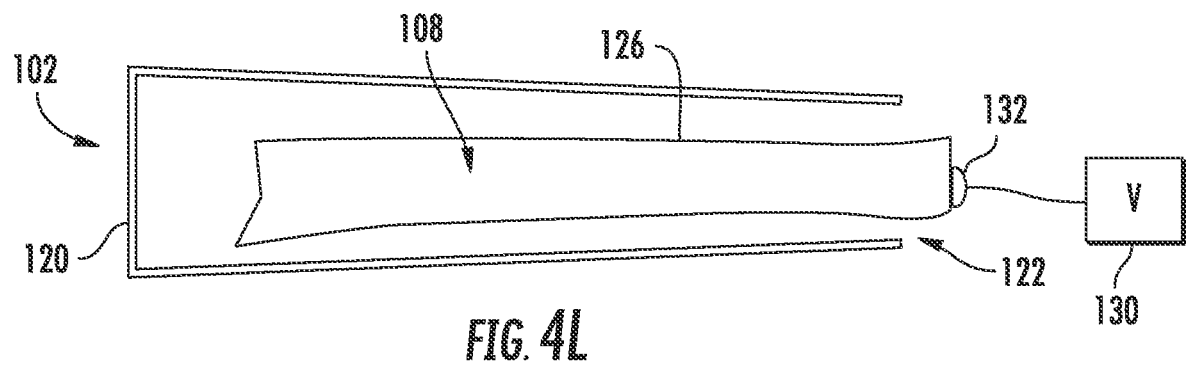

FIG. 4l depicts application of the vacuum on the mandrel 108, which causes the compressible material 114 to compress ("shrink"). At its reduced size, the compressed mandrel 114 (mandrel 108) is then withdrawn through the opening 122 in the composite structure 102.

As discussed above, the type of compressible material 114 used to form all or part of the mandrel 108 can vary. In particular embodiments, the compressible material 114 may be any suitable solid polymeric foam material having a neutral state with sufficient rigidity to maintain its defined shape during the fiber material lay up and curing process. In a particular embodiment, the solid foam material may be an open-cell foam material, particularly from a cost consideration. The solid foam material may be a closed-cell foam material, which are generally more rigid than open-cell foams, but are significantly more expensive. In addition, if a closed-cell foam is utilized, it must be sufficiently compressible via application of a vacuum in order to remove the mandrel 108 from the structural component 102.

Figure 5:
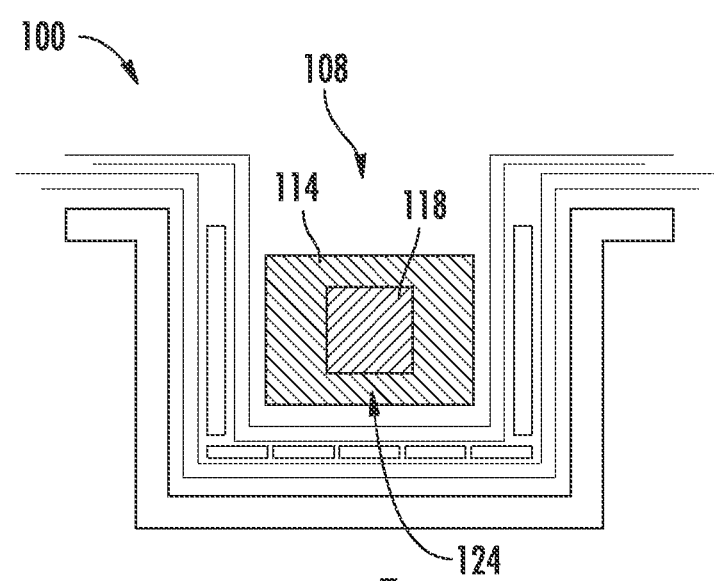
FIG. 5 depicts an alternate embodiment of a mandrel.

Referring for example to FIG. 5, the mandrel 108 may include a combination of different materials, such as different types of foam materials 114, 118. For example, the mandrel 108 may have a core 124 of a more rigid or less rigid closed-cell foam 118 and one or more outer layers of less-rigid open-cell foam 114. As mentioned, the mandrel 108 need not be formed entirely of a compressible material 114. For example, the mandrel 108 may have a non-compressible core 124, such as a plastic or wood core, surrounded by one or more outer layers of a compressible foam material 114. In still other embodiments, the core 124 may simply be an enclosed space.

In order to draw the vacuum on the mandrel 108, the mandrel 108 includes an airtight covering 126 (FIGS. 4k and 4l) surrounding the compressible material 114. This covering 126 may be, for example, an elastic material sprayed or otherwise applied over the foam material, or an elastic bag, wrapping, or sleeve into which the foam material is slid. A vacuum is drawn on the mandrel 108 by connecting the airtight covering 126 to the vacuum source 130, which results in the compression and shrinkage of the mandrel 108.

The method may include subsequently venting the airtight covering 126, for example through the fitting 132 or a different vent, wherein the compressible material 114 has sufficient elasticity to return the mandrel 108 to its rigid neutral state.

The present invention also encompasses various embodiments of a mandrel 108 as discussed above for use in producing a hollow composite structure 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for producing a hollow composite structure, comprising:
   placing fiber reinforcement material within a mold, an inner surface of the mold defining a desired shape of the composite structure;
   placing a mandrel in the mold over the fiber reinforcement material, the mandrel comprising a continuous compressible material in an uncompressed neutral state arranged completely around a core component that is more or less compressible than the compressible material;
   maintaining the neutral state of the compressible material uniformly and completely around the core component in a defined shape corresponding to the desired shape of the composite structure defined by the mold, the compressible material having a rigidity in the neutral state to maintain the defined shape during layup and curing of the fiber reinforcement material completely around the mandrel;
   after placement of the mandrel, wrapping the fiber reinforcement material completely around the mandrel while maintaining the neutral state of the compressible material uniformly and completely around the core component;
   curing the fiber reinforcement material with a resin;
   subsequent to curing, drawing a vacuum on the mandrel to compress the compressible material from the neutral state to a compressed state; and
   withdrawing the mandrel including the compressible material in the compressed state and the core through an opening in the composite structure, the opening having a size such that the mandrel could not be withdrawn through the opening in the rigid neutral state of the mandrel.

2. The method as in claim 1, wherein the composite structure is a tapered box-beam structure having a larger closed end and a smaller open end through which the compressed mandrel is withdrawn.

3. The method as in claim 2, wherein the box-beam structure is a spar structure for use in a wind turbine rotor blade.

4. The method as in claim 1, wherein the compressible material comprises a solid foam material.

5. The method as in claim 4, wherein the solid foam material is an open-cell foam material.

6. The method as in claim 4, wherein the solid foam is a closed-cell foam material.

7. The method as in claim 1, wherein the core component is less compressible than the compressible material.

8. The method as in claim 1, wherein the compressible material comprises a first solid foam material and the core component comprises a second solid foam material that is more rigid or less rigid than the first solid foam material.

9. The method as in claim 1, wherein the mandrel comprises an air tight covering surrounding the compressible material, the vacuum drawn on the mandrel by connecting the covering to a vacuum source.

10. The method as in claim 9, further comprising venting the covering to return the mandrel to its rigid neutral state.

11. A system for use in producing a hollow composite structure, the system comprising:
    a mold comprising an inner surface defining a desired shape of the composite structure;
    a mandrel placeable in the mold, the mandrel further comprising:
      a core component;
      a continuous compressible material completely surrounding the core component and having an uncompressed neutral state with a defined shape corresponding to the desired shape of the composite structure defined by the mold, the compressible material comprising a rigidity in the neutral state to maintain the defined shape during layup and curing of fiber reinforcement material placed completely around and at least partially overlapping on the mandrel;
      the core component being more or less compressible than the compressible material;
      the compressible material transformable into a compressed state upon application of a vacuum at a single location to compress the compressible material completely around the core component;
      the mandrel with the compressible material in the neutral state having a size so as to be placeable in the mold for the layup and curing of the fiber reinforcement material; and
      the compressible material returnable to the neutral state upon release of the vacuum at the single location.

12. The system as in claim 11, wherein the defined shape comprises a tapered shape corresponding to a desired tapered box-beam shape for the composite structure, the tapered shape comprising a larger cross-sectional end and an opposite smaller cross-sectional end.

13. The system as in claim 11, wherein the compressible material comprises a solid foam material.

14. The system as in claim 11, wherein the core component is less compressible than the compressible material.

15. The system as in claim 11, wherein the compressible material comprises a first solid foam material and the core component comprises a second solid foam material that is more rigid or less rigid than the first solid foam material.

16. The system as in claim 11, further comprising an airtight covering surrounding the compressible material, wherein the vacuum is drawn on the mandrel by connecting the covering to a vacuum source.

17. The system as in claim 16, further comprising a vent in the covering.

* * * * *